United States Patent [19]

Fergason et al.

[11] Patent Number: 5,519,524
[45] Date of Patent: May 21, 1996

[54] ACTIVE MATRIX LIQUID CRYSTAL HAVING A COUNTERELECTRODE SUBSTRATE EXTENDED AND CONNECTED TO AN EXTERNAL CIRCUIT

[76] Inventors: James L. Fergason, 92 Adam Way, Atherton, Calif. 94025; Arthur L. Berman, 3514 Milburn St., San Jose, Calif. 95148

[21] Appl. No.: 275,907

[22] Filed: Jul. 5, 1994

[51] Int. Cl.⁶ .................. G02F 1/1345; G02F 1/1339
[52] U.S. Cl. ................................. 359/88; 359/80
[58] Field of Search ............... 359/80, 88, 93, 359/43

[56] References Cited

U.S. PATENT DOCUMENTS

| Re. 32,521 | 10/1987 | Fergason | 359/156 |
|---|---|---|---|
| 3,846,015 | 11/1974 | Moi | 359/88 |
| 3,854,793 | 12/1974 | Kahn | 359/75 |
| 4,106,860 | 8/1978 | Kaufmann | 359/88 |
| 4,114,990 | 9/1978 | Mash et al. | 359/93 |
| 4,385,806 | 5/1983 | Fergason | 359/52 |
| 4,435,047 | 3/1984 | Fergason | 359/156 |
| 4,436,376 | 3/1984 | Fergason | 359/156 |
| 4,469,410 | 9/1984 | Ikesue | 359/80 |
| 4,540,243 | 9/1985 | Fergason | 359/156 |
| 4,582,396 | 4/1986 | Bos et al. | 359/73 |
| 4,587,038 | 5/1986 | Tamura | 359/88 |
| 4,648,691 | 3/1987 | Oguchi et al. | 359/54 |
| 4,862,153 | 8/1989 | Nakatani et al. | 359/83 |
| 4,878,738 | 11/1989 | Hanami | 359/88 |
| 4,917,466 | 4/1990 | Nakamura et al. | 359/62 |
| 4,923,286 | 5/1990 | Grupp | 359/75 |
| 4,958,915 | 9/1990 | Okada et al. | 359/50 |
| 5,045,418 | 9/1991 | Fukuyoshi | 359/68 |
| 5,187,604 | 2/1993 | Taniguchi et al. | 359/88 |
| 5,404,185 | 4/1995 | Vogeley et al. | 359/55 |
| 5,434,433 | 7/1995 | Takasu et al. | 257/79 |

FOREIGN PATENT DOCUMENTS

| 0114931 | 9/1981 | Japan . | |
| 0142315 | 8/1983 | Japan . | |
| 62-47623 | 3/1987 | Japan | 359/88 |
| 0231221 | 10/1987 | Japan . | |
| 2033602 | 5/1980 | United Kingdom . | |

*Primary Examiner*—Anita Pellman Gross
*Assistant Examiner*—Toan Ton
*Attorney, Agent, or Firm*—Renner, Otto, Boisselle & Sklar

[57] ABSTRACT

A miniature image source includes a plurality of substrates, one formed of semiconductor material having an active matrix array and being relatively rough and the other being relatively smooth, a sealed space between the substrates containing liquid crystal material, electrically conductive members or terminal pads of the rough substrate being electrically and mechanically connected to electrically conductive members on the smooth substrate and are brought externally of the sealed space for exposure on the smooth substrate for external electrical connection. A method for making a miniature image source includes mechanically and electrically connecting electrical members of respective substrates using electrical material, sealing a space between the substrates for containing liquid crystal material using seal material, and elevating the temperature of the respective materials to activate first said electrical material and subsequently said seal material.

27 Claims, 2 Drawing Sheets

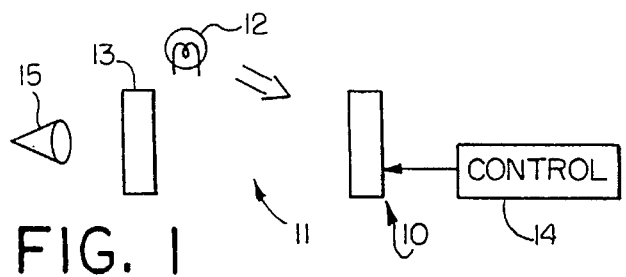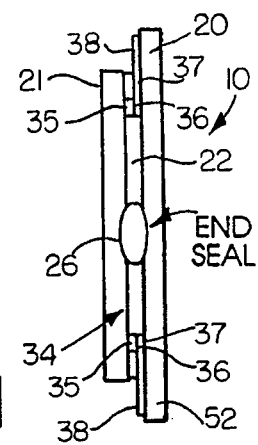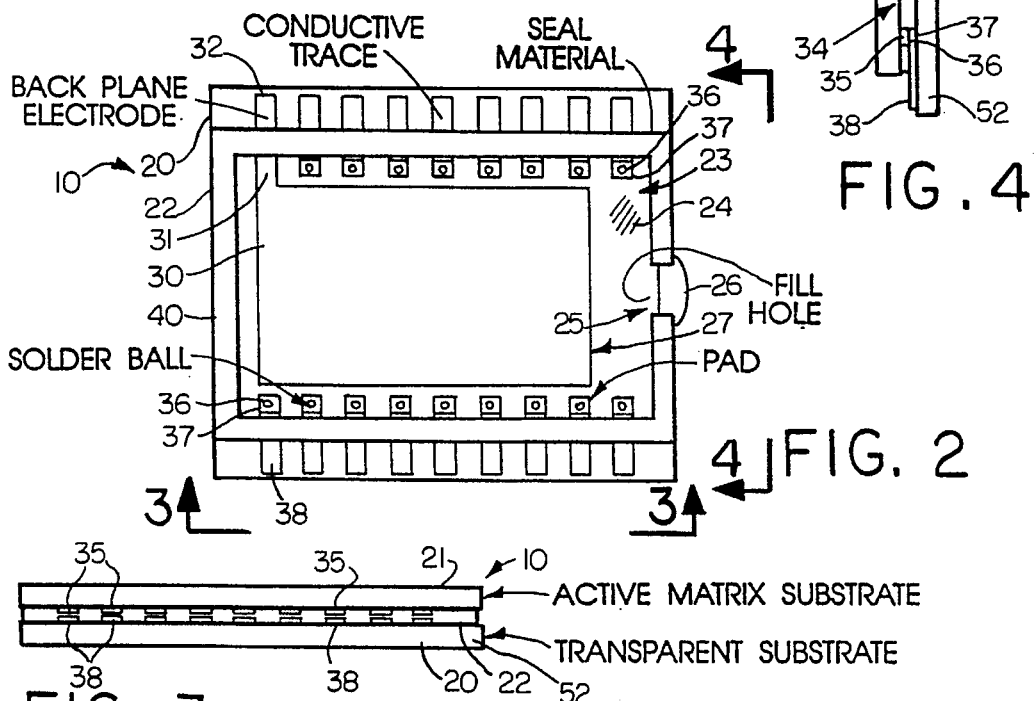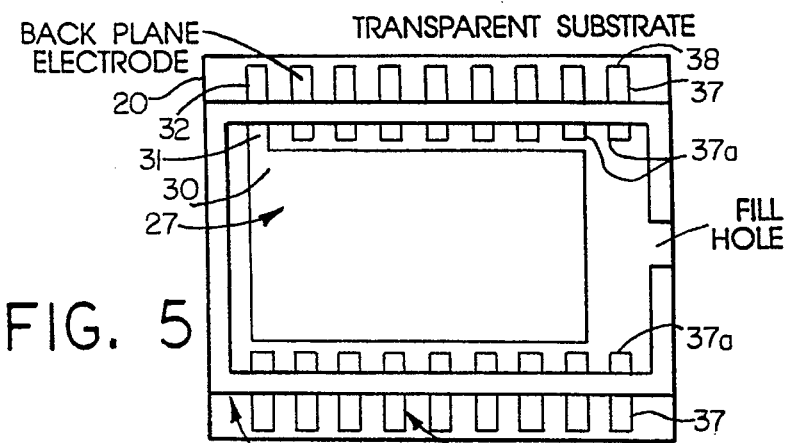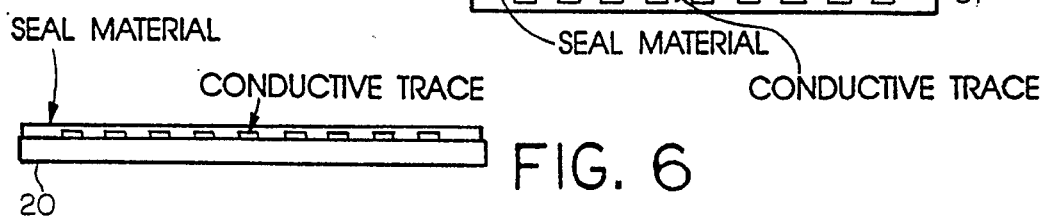

ACTIVE MATRIX LIQUID CRYSTAL HAVING A COUNTERELECTRODE SUBSTRATE EXTENDED AND CONNECTED TO AN EXTERNAL CIRCUIT

TECHNICAL FIELD

The present invention relates generally, as is indicated, to miniature image sources and methods of manufacturing them, and, more particularly, to a miniature image source and method of the liquid crystal display type which uses an active matrix substrate.

CROSS-REFERENCE TO RELATED PATENTS AND PATENT APPLICATIONS

Reference is made to copending, commonly owned, U.S. patent applications Ser. No. 08/187,162 "Illumination System for a Display", Ser. No. 08/187,050 for "Folded Variable Birefringence Liquid Crystal Apparatus" and Ser. No. 08/187,163 for "Variable Intensity High Contrast Passive Display", all of which were filed Jan. 25, 1994. Reference also is made to U.S. Pat. Nos. 4,385,806, 4,436,376, 4,540,243, Re. 32,521, and 4,582,396. The entire disclosures of such patents and patent applications hereby are incorporated by reference.

BACKGROUND

Various types of display systems are known. An exemplary type of display system is a liquid crystal display. Two exemplary types of liquid crystal displays are twisted nematic liquid crystal displays and variable birefringence liquid crystal displays. In each of these two liquid crystal displays an optical output is produced in response to incident or input light and as a function of liquid crystal orientation, which Sometimes is referred to as liquid crystal structure, director, or molecular alignment.

In such liquid crystal displays, liquid crystal material is contained between a pair of parallel, spaced-apart substrates to form a liquid crystal cell. Electrodes or some other means are used to provide electric field to the liquid crystal material or to particular parts of the liquid crystal material to affect orientation and, therefore, optical effect. The input may be other than electric field. Examples include magnetic field and thermal energy inputs.

Surface treatment of a substrate tends to cause that liquid crystal material which is generally in proximity to the particular substrate to align in a preferred direction. Examples of surface treatment include rubbing the surface with cotton, felt, or some other material in a particular direction, which causes the liquid crystal material to align relative to that direction. Another example of surface treatment includes applying a silicon oxide (SiO) or silicon dioxide ($SiO_2$) coating to the surface using an evaporation technique; depending on the angle of evaporation relative to the substrate surface and other factors, which are known in the art, the liquid crystal material will tend to align in a particular direction, which usually is generally parallel to the surface but at some tilt angle, as is well known. Other examples of surface treatment includes the applying of a polyvinyl alcohol (PVA) material to the surface or a polyimide coating to the surface. The various coatings also may be rubbed using cotton, felt or some other material to provide the desired alignment characteristics.

In a twisted nematic liquid crystal cell/the rub direction or primary alignment direction (not considering the tilt angle) at one substrate is at an angle other than 0 degrees or 180 degrees relative to the rub direction or primary alignment direction of the other substrate. For example, the rub or alignment directions of respective substrates may be at 90 degrees to each other in the standard twisted nematic liquid crystal cell so as to provide for a helical twist of 90 degrees in the liquid crystal alignment direction from one substrate surface to the other. In an example of a variable birefringence liquid crystal cell, the rub direction or primary alignment direction of one substrate usually is oriented in parallel with the rub direction or primary alignment direction of the other substrate. The mentioned parallel alignment may be at 0 degrees or at 180 degrees, and there may be the same or different tilt angles at or near respective substrate surfaces of the cell. Other relative alignment directions may be used in respective liquid crystal cells, as is known.

The optical effect may be a change in direction of plane of polarization of plane polarized light (sometimes referred to as linearly polarized light), change in characteristics of plane polarized light to elliptically or circularly polarized light, or vice versa, etc. The optical effect may be a retardation of one quadrature component of polarized light relative to the other quadrature component. Using appropriate optical analyzers, such as a plane polarizer, circular polarizer, wave plates, filters, etc., light from the display can be discriminated or demodulated thereby to form an optical output, such as an image, which is a function of the energization effected on the liquid crystal material at various portions in the liquid crystal display. The image may be information, e.g., alphanumeric type, a scene, view, picture, cartoon, etc., as is well known.

Although the invention is described below with respect to particular types of liquid crystal cells and displays, it will be appreciated that features of the invention may be employed with other types of liquid crystal displays and also with other types of displays, light shutters, and other optical output devices.

Various techniques have been used to provide input, such as an electric field, to a liquid crystal display. Electric field may be applied to selected areas of a display to determine whether or not a particular area is to affect light in a particular way or not. Such areas sometimes are referred to as pixels, pixel areas, picture elements, pels, etc. The assemblage of pixels may be used to form a particular image intended to be produced by the display for direct viewing, projection, etc.

Various driving techniques, i.e., techniques to apply electric field to selected areas of a liquid crystal display, are known. One driving technique is that using crossed electrodes in a matrix form. Another driving technique, especially when the liquid crystal device is used as a shutter, is to use a pair of electrodes respectively over the entire face or substantial portion of the face of each of the substrates forming the liquid crystal cell device or display. Alternatively, for a shutter having numerous electrodes, the electrodes or groups of them may be operated simultaneously selectively to cause desired optical effect over a relatively large area of incident light. Another driving technique is referred to as an active matrix driving technique (sometimes referred to as thin film transistor technique). To supply electrical power, control signals, reference voltage or potential, etc. to a liquid crystal cell of, such a display, usually there are one or more electrically conductive paths, sometimes referred to as traces or by some other name, at or on the substrates. Connections to such traces may be made by electrical connectors having contacts contained in or by a housing, by wire bonding techniques, and the like. The traces also may be or may, include terminal pads, which are electrically conductive and are exposed on a substrate especially for electrical connection thereto. Separate terminal pads also may be provided.

In an active matrix drive technique an active matrix or assemblage of transistors is formed on a semiconductor substrate. The active matrix may be sliced or skimmed from the substrate and applied, e.g., laminated, to a surface of a flat or smooth glass plate, for example. The plate then is used as one of the substrates for the liquid crystal cell. Typically the other substrate would be a transparent glass plate on the surface of which is formed a transparent electrode. The active matrix substrate may include for each pixel an electrode and a transistor. The transistor usually controls the signal to or connection of the electrode. Electrical connection lines or paths associated with the active matrix transistors may be coupled to an appropriate controller, such as a computer, a video receiver, etc., that selectively energizes respective transistors thereby to provide an appropriate signal on an electrode or electrodes controlled by such transistors and, accordingly, to produce an image. The electrode on the second-mentioned substrate may be coupled to a source of reference electrical potential, such as ground. Depending on whether a transistor is energized or not, and perhaps the extent or value of such energization, an electric field may be applied to the liquid crystal material between the active matrix electrode and the other electrode. The electrodes directly associated with the active matrix may be transparent if the display is a transparent one. Such electrodes may be other than transparent, for example, reflective, when the display is a reflective type.

The substrate on which the active matrix is formed actually may be a semiconductor substrate. An example of such a substrate and active matrix is disclosed in one or more of the above-mentioned patent applications, such as in Ser. No. 08/187,050.

A disadvantage of using an active matrix substrate or another semiconductor substrate in a liquid crystal display ,device is the special processing and procedures required to make a liquid cell or display which uses such a substrate. These procedures and processing usually add to the time and expense required to make a liquid crystal cell or display. Also, such special processing and procedures tend to decrease manufacturing yield of the devices, which increases cost per unit manufactured. It would be desirable to minimize the requirement for special processing and manufacturing of liquid crystal cells and displays which use such substrates.

Consistent with the foregoing, it would be desirable to use generally standard liquid crystal cell processing methods to make crystal cells and displays which use an active matrix substrate or a substrate made of semiconductor material. One disadvantage to obtaining alignment of liquid crystal structure in an active matrix liquid crystal cell by rubbing has been found to be damage which may occur to the active matrix materials due to the rubbing. It would be desirable to reduce the requirement for rubbing and, therefore, to increase yield and/or reliability of liquid crystal cells which use active matrix or semiconductor substrates.

Another disadvantage of an active matrix substrate used in a liquid crystal cell is the non-uniformity of the surface thereof, which usually has various peaks and valleys in the surface due to the electronic components formed therein. Such surface non-uniformity may have a noticeable degrading effect on the quality of images produced by a liquid crystal cell. For example, a change in path length of light in such a liquid crystal cell or a random alignment or misalignment of liquid crystal material due to a peak or a valley in a substrate may uncontrollably change optical phase retardation. This negative impact on the display is compounded if the display is used in a reflective mode because light then transmits through the liquid crystal twice.

Making electrical connections to the traces on a relatively rough or unsmooth surface of an active matrix substrate, whether laminated on glass or formed in a semiconductor substrate, may present difficulties compared to making connections to the traces on a smooth glass substrate. For example, due to the rough surface it is possible that the interaction with a contact of a connector may damage the contact, the trace, and/or the material of which the substrate is formed. It would be desirable to reduce the possibility of damage when electrical connections are made to a rough surface substrate.

Although it often is desirable to provide a large surface area of electrical connection to maximize the integrity of the connection, the relatively rough surface of the active matrix material may present a raised land of relatively small cross section that engages the connector contact, thus reducing the surface area of connection. It also would be desirable to maximize surface area of the electrical connections or otherwise to improve electrical connections to an active matrix display.

It would be desirable to simplify the making of electrical connections to the traces on the substrates of a liquid crystal cell. Examples of simplification could include making all of the electrical connections at only one of the substrates or by reducing the number of electrical connections that have to be made to one of the substrates. By reducing the number of electrical connections to one of the substrates, such as the active matrix substrate, and, thus, the density of those connections, and increasing the number of connections to the other substrate, the close spacing requirements for the connector contacts can be relaxed, and the difficulty of makring the connector and the accuracy required for placement of the connector in attached relation to the liquid crystal cell are reduced.

Homogeneous alignment usually refers to an alignment of liquid crystal material in a direction that is generally parallel to the plane of a surface of a substrate of a liquid crystal cell. The liquid crystal material may have a tilt angle relative to the surface. Various tilt angles are possible and are used in various types of liquid crystal devices, as is well known. Exemplary liquid crystal cells which use homogeneous alignment are twisted nematic liquid crystal cells, used, for example, in watch and computer displays. Homeotropic alignment of liquid crystal material usually refers to an alignment that is generally perpendicular (sometimes referred to as normal) to the surface or the plane of the surface of the substrate of the liquid crystal cell. In the past homeotropic alignment was-used in liquid crystal cells that work in a dynamic scattering mode in response to application of an electric current.

Nematic liquid crystal and smectic liquid crystal can have characteristics of birefringence, whereby the ordinary index of refraction and the extraordinary index of refraction are different. In a variable birefringence liquid crystal cell, by changing the orientation or alignment of the liquid crystal (or some of the liquid crystal) relative to the direction of light propagating through the liquid crystal, optical phase retardation can be varied correspondingly. Examples of variable birefringence liquid crystal cells in which optical phase retardation can be varied are described in U.S. Pat. Nos. 4,385,806, 4,436,376, 4,540,243, Re. 32,521, and 4,582,396, which are incorporated by reference. As is described in those patents, by changing the applied input, such as electric field, the alignment of liquid crystal material in the liquid crystal cells can be altered thereby to alter the effective optical phase retardation of the light transmitted through the liquid crystal material. As also is described in the just-mentioned patents, the liquid crystal material in proximity to the respective substrates has generally homogeneous alignment; these portions of the liquid crystal material or liquid crystal layer sometimes are referred to as the surface layers of the liquid crystal material and it is these layers or at least parts thereof which switch alignment in response to applied field input during operation of the liquid crystal cell to change the optical phase characteristics of the liquid crystal cell in response to say application or removal of electric field. The surface layers or surface portions are separated by a portion of the liquid crystal material or a layer thereof which generally is aligned with respect to the surfaces. Such perpendicularly aligned liquid crystal tends not to contribute to optical phase retardation (or whatever contribution it has relatively minimal compared to the possible phase retardation provided by the surface portions). Such generally perpendicularly aligned liquid crystal material also may tend separate the physical/mechanical interaction of the two surface portions of liquid material during operation of the liquid crystal cell as the surface portions switch from one alignment to the other. The liquid crystal material which tends to separate surface portions sometimes is referred to as the "bulk" liquid crystal; whether the bulk is more or less quantity of liquid crystal than the surface portions does not deter use of such label "bulk". Various means may be used to align the bulk portion of the crystal material. Those means may be electrical, mechanical, a combination or some other means, for example, as is described in the aforementioned patents.

It would be desirable to provide variable optical phase retardation in a reflective liquid crystal cell and display using such a cell, and, to do so in a liquid crystal cell that has an active matrix type substrate. It would desirable to provide substantial uniformity of operation and optical phase retardation characteristics in a variable birefringence liquid crystal cell while reducing the affect of and/or without regard to disparities in cell thickness due to peaks and valleys in the substrate.

A miniature image-source can be used to form an image for viewing. Such viewing may be directly, e.g., by the eye of a person, camera, etc. Sometimes such direct viewing requires one or more lenses to enlarge or otherwise to or to enhance the image produced by the image source. The viewing may be indirect by projecting the image from the image source onto a screen, for example, which is viewed. In the present invention a miniature image source uses one or liquid crystal cells (one being described in the embodiment below), and/or as shutters, or other types of optical display or shutter devices, to create images, etc. for direct viewing, for projection; etc. Additional optics, such as polarizers, analyzers, wave plates, optical retarders, filters, lenses, etc., and a light source also may be used with the miniature image source to create images. Power and control also may be provided, such as by electrical, magnetic, and/or thermal sources.

SUMMARY

According to one aspect of the present invention, a miniature image source is formed by a pair of substrates which have electrically conductive, traces thereon and one or more traces on one substrate are connected to a trace on the other substrate for external electrical connection. Liquid crystal material or other material or medium located between the two substrates is operable to provide a desired optical response to the energization condition of the image source.

According to another aspect of the invention, a method of making a miniature image source includes joining two substrates between which is placed or to be placed a material or a medium, such as a liquid crystal material, used to develop an optical response. A seal is formed between the substrates to retain the material there, between. One or more electrically conductive traces, conductors, pads, paths, etc., of one substrate are connected within the area confined by the seal to respective electrically conductive traces, conductors, etc., on the other substrate and are brought out to the other side of the seal on such other substrate for external electrical connection thereof.

According to another aspect of the invention, a conventional liquid crystal cell processing and manufacturing steps can be used to make a liquid crystal cell and/or image source using such a cell without the need for special processing otherwise required for active matrix substrate type liquid crystal cells.

According to an aspect of the present invention, at least part of the connection to the external controller, etc. requirements for an active matrix substrate of a miniature image source device or liquid crystal cell is transferred to the smooth glass substrate thereby to facilitate making and/or to enhance the integrity of those electrical connections and/or the sealing of the liquid crystal material in the device.

The present invention facilitates making a liquid crystal cell or display device having a plurality of pixel elements driven by active matrix technique, especially in the case in which a semiconductor material is one of the substrates.

According to one aspect of the invention, a miniature image source includes a plurality of substrates, each substrate having at least one electrical member, electrical connecting material for adhering and electrically connecting an electrical member of one substrate with respect to an electrical member of the other substrate, and means for sealing a space between the substrates, and means in the space for responding to selective electrical energization to cause an optical effect.

According to an aspect of the invention, a liquid crystal cell device source includes a plurality of substrates, each substrate having at least one electrical member, electrical connecting material for adhering and electrically connecting an electrical member of one substrate with respect to an electrical member of the other substrate, means for sealing a space between the substrates, and liquid crystal in the space for responding to selective electrical energization to cause an optical effect, the liquid crystal material in relative proximity to one surface exhibiting generally homeotropic alignment, the liquid crystal material in relative proximity to the other surface exhibiting generally homogeneous alignment.

According to an aspect of the invention, a liquid crystal cell device source includes a plurality of substrates, each substrate having at least one electrical member, and one of the substrates comprising a semiconductor base having plural integrated circuits therein, electrical connecting material for adhering and electrically connecting an electrical member of one substrate with respect to an electrical member of the other substrate, means for sealing a space between the substrates, and liquid crystal in the space for responding to selective electrical energization to cause an optical effect, the liquid crystal material in relative proximity to one surface exhibiting generally homeotropic alignment, the liquid crystal material in relative proximity to the other surface exhibiting generally homogeneous alignment.

According to another aspect of the invention, a method for making a display includes the steps of placing at least two substrates in confronting relation, each substrate having at least one electrical member, physically and electrically connecting an electrical member of one substrate with respect to an electrical member of the other substrate, sealing a space between such substrates, and placing in such space a material which is responsive to an electrical input to cause an optical effect.

According to another aspect of the invention, a method for making a display includes the steps of placing at least two substrates in confronting relation, placing liquid crystal material in the space between the two substrates, preconditioning the liquid crystal material to switch between and/or in a range of retardations to provide relatively minimal optical phase retardation and increased optical phase retardation, each substrate having at least one electrical member, physically and electrically connecting an electrical member of one substrate with respect to an electrical member of the other substrate, and sealing the space between such substrates.

According to another aspect of the invention, a method for making a display includes the steps of placing at least two substrates in confronting relation, one of the substrates being a semiconductor material having plural electronic devices therein, placing liquid crystal material in the space between the two substrates, preconditioning the liquid crystal material to switch between and/or in a range of retardations to provide relatively minimal optical phase retardation and increased optical phase retardation, each substrate having at least one electrical member, physically and electrically connecting an electrical member of one substrate with respect to an electrical member of the other substrate, and sealing the space between such substrates.

According to another aspect of the invention, a method for making a display having a pair of substrates, each having a electrically conductive material associated therewith, and optical material in a space between such substrates for responding to a prescribed input to provide an optical effect includes placing a thermally activatable material between an electrically conductive material of one substrate and an electrically conductive material of the other substrate, placing a thermally activatable sealing material between such substrates for sealing such space, and applying thermal energy to both such thermally activatable material and such thermally activatable sealing material.

To the accomplishment of the foregoing and related ends, the invention, then, comprises the features hereinafter fully described and particularly pointed out in the claims. The following description and the annexed drawings set forth in detail a certain illustrative embodiment of the invention. This embodiment is indicative, however, of but one of the various ways in which the principles of the invention may be employed.

Although the invention is shown and described with respect to one embodiment, it will be evident that equivalents and modifications will occur to others who have ordinary skill in the art upon the reading and understanding of the specification. The present invention includes all such equivalents and modifications and is limited only by the scope of the claims.

BRIEF DESCRIPTION OF THE DRAWINGS

In the annexed drawings:

FIG. 1 is a schematic illustration of an optical system using a miniature image source in accordance with the present invention to create images for direct viewing or for projection;

FIGS. 2, 3 and 4 are, respectively top plan, end elevation, and side elevation views of the miniature image source of FIG. 1;

FIGS. 5 and 6 are, respectively, top plan and side elevation views of one substrate of the miniature image source;

DESCRIPTION

Figure 7:
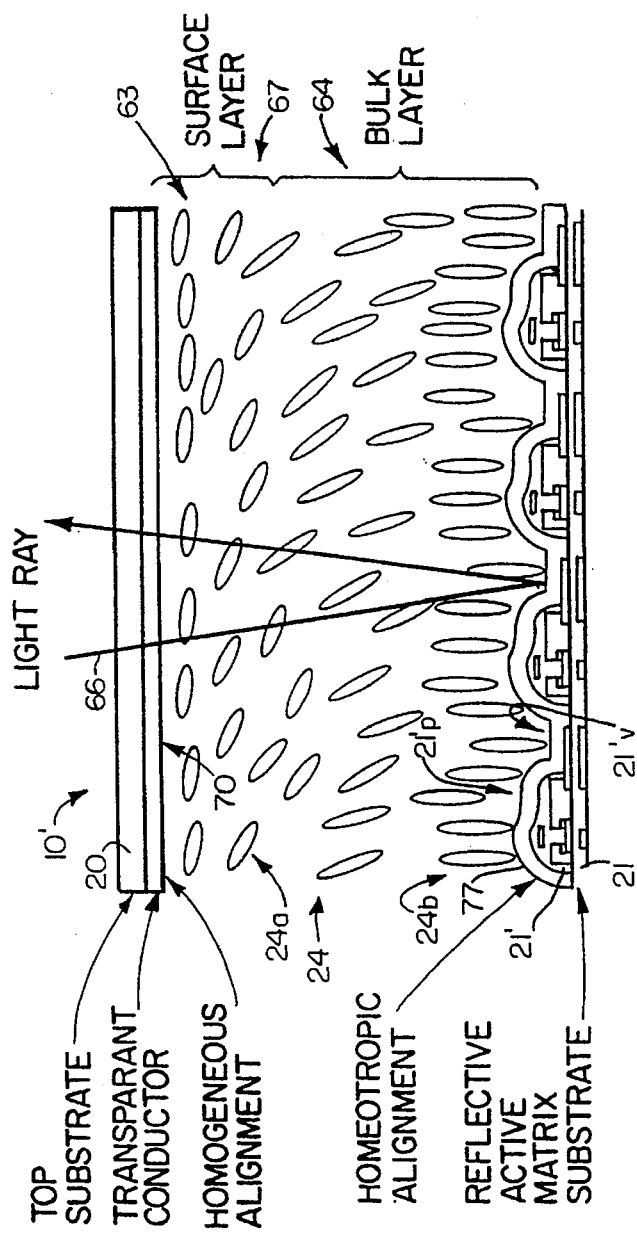
FIG. 7 is a schematic side elevation view of a reflective variable birefringence liquid crystal cell having an active matrix substrate, the cell being aligned ready for operation.

Referring to the drawings, wherein like reference numerals designate like parts in the several figures, and initially to FIG. 1, a miniature image source in accordance with the invention is generally shown at 10. The image source 10 may be of the type disclosed in copending U.S. patent applications Ser. Nos. 08/187,162, 08/187,050, and 08/187,163. However, it will be appreciated that the image source 10 may be other types of optical devices, optical systems, liquid crystal displays, liquid crystal shutters, and the like, all of which are considered to be equivalents in the sense of being able to utilize the features of the present invention herein disclosed. The image source 10 may be of the reflective type in which an image is created and viewed by reflection from the image source or of the transmissive type in which the image is created by light transmitted through or blocked by the image source without or substantially without reflection.

The present invention may be used with liquid crystal type display devices. However, it will be appreciated that the invention may be used with other types of display devices. An advantage to liquid crystal type display devices is the relatively low power requirement for operation. Another advantage to liquid crystal type display devices is the ability to use active matrix driving/energizing technology. In response to input signals to the display device, images can be created.

In the exemplary embodiment of the invention described herein the image source is a reflective type which is used to produce an image for viewing directly and/or for projection. Direct viewing also includes the possibility of viewing through a lens, aperture, via reflectors, etc.

As is seen in FIG. 1, the image source 10 can be used in an optical system 11 which includes a light source 12, optics 13, and a controller 14. The light source 12 illuminates the image source 10. The controller 14 may be a computer, video circuitry, or the like, which generates power and/or control signals to operate the image source to create desired images by the image source. The optics 13 may include one or more components to convert the image or image characteristics produced or created by the image source 10 to an image capable of being viewed directly and/or of being projected for viewing on a screen or the like by the eye(s) 15 of a person, by a camera or machine, etc. Thus, the optics 13 may include polarizers, wave plates focusing components such as one or more lenses and/or reflectors, filters, etc.

Turning to FIGS. 2–4, a miniature image source 10 according to an embodiment of the present invention is illustrated. The miniature image source includes a pair of substrates 20, 21 which are held together in sealed relationship by a seal 22. The substrate 21 is not actually seen in the view of FIG. 2 in order to be able to show other parts of the image source 10; the substrate 21 is seen in FIGS. 3 and 4.

The substrate 20 is transparent glass which has relatively smooth surfaces. Plastic and/or other materials alternatively may be used for the substrate 20. The substrate 21 is a reflective active matrix substrate; it may be either of the laminated type or of the type which uses a semiconductor substrate body, such as silicon or other appropriate material. Alternatively, the substrate 21 may be smooth glass, plastic or other material, and it may be transparent.

The seal 22 in cooperation with the substrates 20, 21 provides a relatively enclosed volume or space 23 in which liquid crystal material 24 is contained. If desired additional clamping, adhesive, or other means may be used to hold the substrates together. A fill hole 25 in the seal 22 may be provided through which to place the liquid crystal material 24 into the space 23; and the fill hole subsequently may be closed in sealed relation by a plug 26 of appropriate material, such as a mechanical plug, additional material of which the seal 22 is made, epoxy, etc. The display area 27 of the image source 10 is within the space 23 circumscribed by the seal. Electrical connections for the image source 10 to the controller 14 are made outside or external of the seal 22 relative to the display area 27 and perimeter of the seal.

On the substrate 20 is a transparent electrode 30, sometimes referred to as a backplane electrode, which usually is electrically connected via an electrically conductive trace or path 31 to a terminal pad 32 for electrical connection to a source of reference electrical potential, such as ground reference potential or some other potential. The terminal pad 32 may be an end portion of the trace 31 and it is intended to connect with a contact of an electrical connector, for example, or to a wire bonded connection of an electrically conductive lead or the like. The electrode 30, trace 31 and terminal pad 32 may be applied to a surface of the substrate 20 by conventional processing.

On the other substrate 21 is a plurality of electrodes 33 (seen in FIG. 7) which are part of an active matrix array, circuit, or the like generally designated 34. Only several electrodes 33 are shown in FIG. 7 as examples; however, as is known, the number of such electrodes in a typical active matrix liquid crystal display may number in the thousands. One example of active matrix array is that disclosed in the above-referenced patent applications. Other types of active matrix array or other driving mechanism may be used selectively to provide respective voltages, voltage levels (possibly even zero voltage), or the like to respective electrodes thereof or connected thereto. Control of the voltages applied across the backplane electrode 30 and respective electrodes 33 associated with the active matrix 34 is provided by the controller 14.

The active matrix 34 includes conductors (not shown) which are coupled to respective electrically conductive terminal pads 35. According to the invention solder connections 36 connect the terminal pads 35 to electrically conductive traces or paths 37, which are located on the smooth substrate 20. Means other than solder may be used for such mechanical and electrical connections of such respective electrical conductors of respective substrates; preferably thermally activatable material is used for such purpose for convenience of manufacturing, for example. The traces 37 on the substrate 20 terminate at terminal pads 38 located outside of the display area 27 and perimeter of the seal 22 and are exposed for electrical connection to the controller 14.

In the embodiment of the invention described herein the liquid crystal material 24 is nematic liquid crystal material or operationally nematic liquid crystal material. Operationally nematic liquid crystal material is that which may or may not be nematic, but which operates like nematic liquid crystal material to obtain the type of operation that nematic liquid crystal material would provide in the present invention. It also will be appreciated that the invention may be used with other types of liquid crystal material, one example being smectic liquid crystal material, and/or mixtures of liquid crystal materials. The invention also may use NCAP liquid crystal material (such as that disclosed in U.S. Pat. No. 4,435,047), PDLC (polymer dispersed liquid crystal) material, polymer gels, and other liquid crystal materials and liquid crystal systems as the liquid crystal material 24 in the miniature image source 10, for example, in the space 23 thereof.

Usually in a nematic liquid crystal device/it is desirable to provide one alignment of liquid crystal structure absent application of a prescribed input to obtain one optical output or response. A different alignment of liquid crystal structure usually is obtained in response to a prescribed input of desired or sufficient magnitude. Different alignments provide different optical outputs or responses.

Various techniques are used to obtain an alignment, such as a generally homogeneous alignment, in the absence of a prescribed input. One alignment technique to align the liquid crystal structure absent a prescribed input includes rubbing the surface of the substrate, the electrode on the surface of the substrate or some other alignment coating or deposit thereon. Exemplary alignment coatings are polyvinyl alcohol or polyimide, on the surface of the substrate or electrode. Another alignment technique includes applying an evaporated coating at an appropriate angle, such as silicon dioxide ($SiO_2$), onto the substrate or the electrode, which coating also may be rubbed. Other alignment techniques may be used equivalently in the invention.

Various techniques are available for providing the surface treatment 32 to obtain generally homeotropic alignment. For example, the surface 30 may be coated with a Langmuir film using known processing techniques. The Langmuir film is a surfactant, which forms a monomolecular film. Another surface treatment may be provided by applying barium stearate to the surface 30. A further example is to use a steryl silicone material on the surface 30. Still another coating material for the surface 30 is silane. A silane material, for example, provides fatty acid molecules standing on their ends or tails, which tend to cause the nematic liquid crystal structure to align homeotropically. The foregoing are examples of techniques conventionally used to obtain homeotropic alignment of nematic liquid crystal material. Other techniques also may be used to achieve the structure and functions of the invention describe herein.

Absent a specific surface treatment to obtain homeotropic alignment of the liquid crystal material in relative proximity to the surface 30, the liquid crystal structure at the surface 30 would tend to follow the contour of the surface somewhat in parallel thereto. Due to the roughness, unevenness, waviness, etc. of the surface 30, a relatively random orientation of the liquid crystal structure there would tend to occur, which would be undesirable for a liquid crystal cell whose operation in response to the presence or absence of an input, or a variation in the magnitude of the input, should be predictable.

The rubbing surface treatment mentioned above with respect to obtaining homogeneous surface treatment and surface alignment of liquid crystal material may in some instances cause static electrical charge. It may be undesirable to have such a static charge on a semiconductor substrate. If the surface 30 has homeotropic alignment, such rubbing may be avoided.

Examples of variable birefringence liquid crystal cells and devices useful in the image source of the invention are disclosed in the above-referenced patent applications and patents. Some of these variable birefringence devices are referred to as surface mode liquid crystal cells or devices or Pi cells. Another example of a liquid crystal cell and display device useful in the invention is a twisted nematic type liquid crystal device. Sometimes such a device is referred to as a wave guiding device.

Whether the liquid crystal display device is of the variable birefringence type, the twisted nematic type, or some other type, usually by employing one or more plane polarizers, plane analyzers, circular polarizers, wave plates, and the like in the optics 13 the optical characteristics of light from the display can be decoded, demodulated, etc., to obtain an output image, information, etc. for viewing, projection, etc.

In the illustrated embodiment, the liquid crystal cell 40 of which the image source 10 is comprised of the variable birefringence type disclosed in the above referenced U.S. patent applications. One or more of the electrodes of the active matrix 34 in cooperation with the backplane electrode 30 and the liquid crystal material 24 form or define respective picture elements, sometimes referred to as pixels, pels, or the like. Each pixel or group of pixels can be respectively operated in response to signals from the controller 13 in order to form an image, which is an optical output or response of the image source 10. As the controller 14 applies respective signals (or does not apply signals, e.g., applies a zero voltage signal) to the terminal pads 32, 38, electric field is or is not applied across respective electrodes of the pixels, and accordingly, in cooperation with the source of illumination 12 and the optics 13, an image can be created by the image source 10.

Referring to FIGS. 5 and 6, the substrate 20 is shown in plan and side views. The substrate 20 may be a glass, plastic or other material. The backplane electrode 30 covering the display area 27 at which the image is to be formed is deposited on a surface of the substrate, preferably the surface intended to face the active matrix substrate 21. Preferably the substrate 20 is optically transparent so light can transmit therethrough; and the electrode 30 also preferably is transparent. The electrode 30, electrically conductive path 31, terminal pad 32, electrically conductive paths 37, and terminal pads 38 preferably are formed on the substrate 20 as electrically conductive traces in conventional manner. Since the substrate 20 preferably is glass, which is relatively smooth, it is relatively easy to connect to the respective terminal pads 32, 38 by an electrical connector or by wire bonding technique.

The substrate 21 preferably is a semiconductor material, such as silicon, having therein the various components of the active matrix, as is described in the above patent applications. Alternatively, the substrate 21 may be a glass plate with a laminated active matrix applied thereto in conventional manner. The substrate 21 also may be another material and may have another arrangement of conductors, electrodes, etc. thereon and/or therein to provide application of input to liquid crystal material 24 in the space 23.

With the substrate 21 being a semiconductor material, which usually is not very smooth, indeed, usually is relatively rough compared to a smooth glass plate, it is relatively difficult to provide direct electrical connections to the conductors of such active matrix. Therefore, solder connections 36 are provided between the terminal pads 35 on the substrate 21 and areas or portions 37a of the electrically conductive paths 37 on the substrate 20; and the electrically conductive paths 37 are brought out to the external (outside display area 27) terminal pads 38 on the substrate 20 for relatively easier electrical connection thereto.

A preferred material for making the electrical and mechanical connections, such as those shown at 36, is a conductive polymer. The conductive polymer may be a polymer filled with carbon, silver or some other electrically conductive material, as is known. The conductive polymer may be silk screened directly onto the terminal pads 35 and/or onto the portions 37a of the conductive paths 37. Alternatively, a conductive epoxy, such as an epoxy with a filler of carbon, silver or other conductive material, may be used as such conductive material to make the indicated connections.

The above described arrangement of making electrical connections to the active matrix minimizes and simplifies the electrical connections which have to be made to the active matrix..

The image source 10 may use flip chip technology for the substrate 21. A flip chip employs electronic devices, such as transistors and/or other devices, in a semiconductor substrate. A flip chip performs both electrical and mechanical connection after the chip is inverted and bonded face down to another substrate interconnection pattern. Usually a flip chip has relatively large pads to which such connections can be made.

Referring back to FIG. 7, the following description is based on the exemplary liquid crystal cell 10', as the miniature image source 10 or as part of such source, having a transparent top substrate 20 and a non-planer reflective active matrix semiconductor bottom substrate 21. The top substrate 20 is treated to provide generally homogeneous alignment to the liquid crystal material relatively proximate thereto. The bottom substrate 21 is treated to obtain generally homeotropic alignment of the liquid crystal material relatively proximate thereto.

In FIG. 7 are illustrated numerous oval shapes or ellipses intended generally to depict the nematic liquid crystal material 24 in the cell 10' and the approximate alignment characteristics of that liquid crystal material in the area where the oval is located. Where the major axis of the oval generally is horizontal, i.e., generally in parallel to the substrate 20, homogeneous alignment exists; and where the major axis, of the oval is vertical, the alignment of the liquid crystal material in that area is homeotropic. A given oval represents a substantial amount of liquid crystal material, not just a single liquid crystal molecule; such ovals, dashed lines, and other types of representations are used conventionally to depict the liquid crystal material and alignment thereof, as is conventional.

The liquid crystal material 24a is included in a surface layer 63 of liquid crystal 24, and the liquid crystal 24b is included in a bulk layer 64 of liquid crystal material 24. As is seen in FIG. 7, liquid crystal material between the homogeneously aligned liquid crystal 24a and the homeotropically aligned liquid crystal 24b tends to be aligned at an angle other than homeotropic or homogeneous. In FIG. 7 that liquid crystal material which tends to have alignment which is more nearly homeotropic is indicated as a bulk layer 64 of liquid crystal material 24, and that liquid crystal material which tends to be more homogeneously aligned than homeotropically aligned is labeled the surface layer 63. The liquid crystal material is birefringent.

In operation of the liquid crystal cell 10' optical phase retardation is increased when plane polarized light is transmitted across the extraordinary direction of the liquid crystal material. However, optical phase retardation usually is not affected when the plane polarized light travels along the liquid crystal axis, usually referred to as the ordinary axis.

From the foregoing, then, it will be appreciated that the surface layer 63 will have a greater impact on optical phase retardation than will the bulk layer 64 of the liquid crystal material shown in the liquid crystal cell 10'. The actual thickness of the surface layer 63 and of the bulk layer 64 may vary and may be selected as a function, for example, of the particular liquid crystal material used, the birefringence characteristic thereof, the indices of refraction thereof, the response thereof to application of electric field, and possibly other characteristics. It is intended that as the magnitude of electric field applied across the liquid crystal cell 10 increases, the amount of optical phase retardation will decrease, and vice versa. Therefore, in a sense, as the magnitude of electric field increases, the thickness of the surface layer 63 decreases and the thickness of the bulk layer 64 increases; and vice versa as the magnitude of the electric field voltage is decreased.

Application of electric field to the liquid crystal cell 10' tends to enhance the uniformity of homeotropic alignment of the liquid crystal material 24b adjacent the surface 21' of the substrate 21 so that peaks and valleys, undulations, etc., in the surface 21' will not cause the liquid crystal material there to follow such uneven surface. Since light 66 traveling through the liquid crystal 24b travels along the ordinary axis of the liquid crystal material and experiences primarily the ordinary index of refraction thereof, increased path length through the liquid crystal material 24b will not increase the optical phase retardation of the light 66. However, as the area 67 between the surface layer and the bulk layer 63, 64 moves toward or away from the substrate 20 to decrease or to increase the thickness of the surface layer 63, optical phase retardation effect on the light 66 correspondingly will be decreased or increased. Alignment of liquid crystal material in the bulk layer 64 tends not to be significantly altered, whereas alignment of liquid crystal material in the surface layer 63, particularly that liquid crystal material that is adjacent the bulk layer 64, tends to alter alignment as the applied field increases or decreases.

Reference to the surface layer, bulk layer, and area therebetween is intended to refer to approximate locations in the liquid crystal cell 10' and approximate portions of the liquid crystal material. Usually there is no precise location where the surface layer ends and the bulk layer begins. Rather, there is a somewhat uniform and gradual transition (the transition may be sharper or more gradual than that illustrated) between the surface layer in which a more significant amount of optical phase retardation would be expected to occur and the bulk layer where a less significant amount of optical phase retardation would be expected to occur. That is to say, the alignment of liquid crystal in part or even in all of the bulk layer may be other than perfectly homeotropic and alignment in the surface layer may be other than perfectly homogeneous. However, such alignments are sufficiently different that most of the optical phase retardation occurs in the surface layer.

The liquid crystal cell 10' may be approximately six microns thick, that is the thickness of the liquid crystal material 24 or the distance between the surfaces 20, 21. Since the liquid crystal cell 10' is reflective, whereby light 66 travels through the liquid crystal material 24 twice, the effective thickness of the liquid crystal cell 10' would be about 12 microns. In operation of the liquid crystal cell 10', though, optical retardation primarily is provided by the surface layer 63 of liquid crystal material. The actual thickness of the liquid crystal cell may be greater or less than six microns. The actual thickness dimension selected may be a function of the birefringence characteristics of the liquid crystal material, index of refraction characteristics of the liquid crystal material, dielectric anisotropy characteristics of the liquid crystal material, other electrical or optical characteristics of the liquid crystal material, speed of response desired, energy requirements and availability, and possibly other characteristics or parameters.

In operation of the liquid crystal cell 10', absent application of an electric field or any energization of the liquid crystal cell, the liquid crystal 24a will have generally homogeneous alignment in proximity to the substrate 20. The liquid crystal material 24b in proximity to the surface 21' of the substrate 21 will have generally homeotropic alignment. Due to the undulations in the surface 21', it is possible that some of the liquid crystal material 24b may be aligned in a direction that is altered relative to a direction perpendicular to the generally flat plane of the substrate 21. The liquid crystal material 24 will provide optical phase retardation with respect to plane polarized light 66. This at rest condition exists when the liquid crystal cell 10' has been at rest for a period of time such that there is no alignment effect due to application of electric field at that time or immediately preceding that time. The cell 10' may provide more than ¼ lambda retardation in the at rest condition. Therefore, when the cell 10' is operated at the preconditioned and fully energized states described below between maximum desired controlled retardation of, for example, ¼ lambda (½ lambda for the combined incident and reflected passes of light through the cell) or some other desired amount of retardation and minimal retardation (zero retardation or near zero retardation) can be achieved.

Upon application of a minimal level electric field, the tendency of the liquid crystal material 24b to have homeotropic alignment is buttressed by such field. Such electric field, though, would have relatively minimal impact on the liquid crystal 24a in the surface layer 63 due to the relatively stronger influence of the surface 20' of the substrate 20 and homogeneous alignment layer 70 on the liquid crystal material 24a. In this pre-aligned condition or pre-conditioned state of the liquid crystal cell 10', the liquid crystal material 24 provides optical phase retardation to the plane polarized light 66. The pre-aligned condition is obtained in the illustrated example by applying a relatively low voltage electric field across the liquid crystal cell 10'. However, such pre-aligned condition of the liquid crystal material can be obtained by other means, such as by periodically applying a relatively larger electric field to the liquid crystal material and permitting the liquid crystal material subsequently to relax, and then repeating application of the field. Also, mechanical or magnetic field means or other means or driving technique may be used to obtain the pre-aligned condition.

By increasing the voltage of the electric field, more of the liquid crystal material in the bulk layer 64 tends to align substantially homeotropically like the liquid crystal 24b, and some of the liquid crystal material in the surface layer 63 tends to align homeotropically, thus reducing the thickness of the surface layer 63. Ideally all of the liquid crystal material in the surface layer 63 would align homeotropically in response to application of a maximum voltage electric field; however, in practice this usually is not the case. Rather, at least a relatively thin layer of liquid crystal material 24a will remain in at least partial homogeneous alignment even when a relatively large voltage electric field is applied. In any event, upon application of such relatively large voltage, the amount of optical phase retardation provided by the liquid crystal material 24 to plane polarized light 66 will be reduced to a minimum. Compensation for residual optical phase retardation due to the liquid crystal material 24a that does not align with respect to a relatively large voltage electric field can be provided, for example, in the manner disclosed in U.S. Pat. No. 4,385,806.

The compensation for residual birefringence can be provided by using an evaporated wave plate. The evaporated wave plate may be applied directly on the glass, quartz or other transparent substrate 20. Alignment of the slow axis of the wave plate preferably is such as to remove or to reduce the affect of residual birefringence of the liquid crystal cell 10'. For example, the slow axis of such compensating wave plate may be at 90 degrees to the rub direction of the homogeneously aligned liquid crystal material 24a, for example. The compensating wave plate may be a quarter wave plate, a 1/10th wave plate, and so on, as may be desired to provide the desired amount of compensation.

In the example described above of liquid crystal cell 10' in FIG. 7, upon application of maximum voltage electric field, zero optical phase retardation occurs (zero optical phase retardation includes the possibility of a relatively small amount of residual optical phase retardation mentioned above). Upon application of a reduced voltage electric field to obtain the pre-alignment condition mentioned above for the liquid crystal material 24, the liquid crystal material 24 provides a specified amount of optical phase retardation. For example, such specified amount of optical phase retardation may be one-quarter wave retardation on each pass of light through the liquid crystal 24. One quarter wave retardation is applied or occurs as the light 66 is directed toward and travels to the surface 21' and one-quarter wave for the light 66 reflected away from the surface 21' and travelling to the substrate 20, for a total sum of one half wave retardation. Alternatively, the liquid crystal cell 10' may be used to provide more or less than a total of half wave optical phase retardation when the liquid crystal material is in the pre-aligned condition. It is possible to vary the optical phase retardation between minimum (e.g., zero) and maximum (e.g., ¼ wave) in a step function by adjusting the voltage of the electric field, respectively to the maximum or to the minimum. The amount of optical phase retardation also can be varied substantially continuously over a range between and including the minimum and maximum by fully varying the voltage of the electric field to the liquid crystal between and including the relatively low level that provides the pre-aligned condition and the relatively high level that provides the substantially zero optical phase retardation.

When the liquid crystal cell 10' is in the fully de-energized or rest state absent any electric field, the amount of optical phase retardation ordinarily would be more than that occurring during the low level energization pre-aligned condition. Low level energization sets up the pre-conditioned alignment of the liquid crystal material which may help buttress homeotropic alignment at the substrate 21 and which may establish a prescribed amount of optical phase retardation provided then by the liquid crystal material, for example, by adjusting the effective thickness of the surface layer 63. As is mentioned elsewhere herein, other techniques to provide preconditioning of the liquid crystal material also may be used, such as mechanical, magnetic or some other means and/or technique.

In some circumstances, if the homeotropic alignment provided by the surface treatment 71 is rather precise and does not require buttressing by application of a relatively low voltage electric field, or if the nonuniformity and optical phase retardation across the face of the liquid crystal cell due to the misalignment occurring in the homeotropically aligned liquid crystal 24b and/or the increased path length or decreased path length due to peaks and valleys 21'p, 21'v for the light ray 66 can be tolerated or accepted, it is possible that the pre-aligned condition and the fully de-energized condition of the liquid crystal cell 10' may be the same. In such case, no separate low voltage electric field is required to obtain the pre-aligned condition; rather, such pre-aligned condition would be acceptably obtained by the surface treatment 71, for example. Substantially maximum optical phase retardation of which the cell 10' is capable would occur at that time, such as that obtained by Langmuir film technique or some other technique. However, upon application of electric field, the amount of optical phase retardation would be reduced.

The liquid crystal cell 10' may be used as a shutter for simultaneously providing substantially the same amount of optical phase retardation to all light incident thereon. Such shutter effect may be provided substantially continuously or may provide a field sequential type operation or effect (sometimes referred to as frame sequential operation or effect) whereby one optical phase retardation condition exists and subsequently a different optical phase retardation condition exists; and such operation is repeated periodically. Other types of field sequential or frame sequential operation of the liquid crystal cell 10' as a shutter also may be employed as will be evident to those who have ordinary skill in the art from the description herein. For example, in a color sequential addressing mode of operation described below, the cell 10' may be used in a display to present respective color parts of an image at different times in sequence and the eye can integrate or add those images to form a full color image that is a still image or has motion. The liquid crystal cell 10' in the image source 10 also may be used in plural pixels to constitute a liquid crystal display in which respective pixels form part of the formed image.

Figure 9:
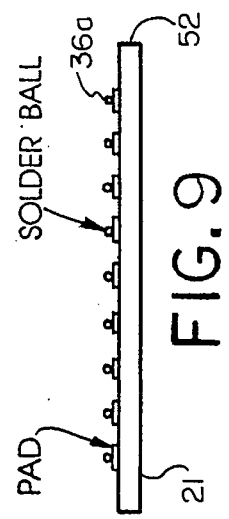
FIGS. 8 and 9 are, respectively, top plan and side elevation views of the active matrix substrate of the miniature image source.
Figure 8:
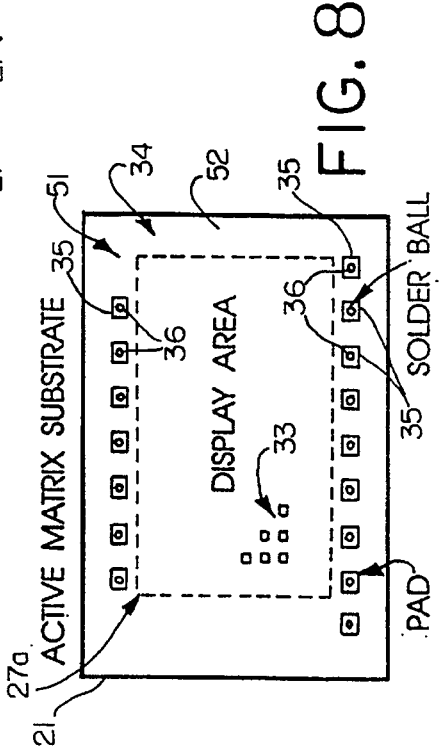

Briefly referring to FIGS. 8 and 9, the active matrix substrate 21 is shown in plan view looking toward the face of the active matrix which would be flipped over to confront the substrate 20 of FIG. 5. The substrate 21 is reflective, is made of silicon or other semiconductor material or the like, and contains the active matrix array 34 and electrodes 33. As is seen in FIG. 8, the display area 27a of the active matrix corresponds in area to the area of the backplane electrode 30. Looking straight at the display area 27a in FIG. 8 one would see the electrodes 33 and/or transistors, etc. of the active matrix 34; but these details are omitted for simplicity although several exemplary electrodes 33 are shown schematically.

At the area 51 of the active matrix substrate 21 there is no terminal pad 35 because it is at that location on the substrate 20 that the electrically conductive path 31 and terminal pad 32 associated with the backplane electrode 30 are brought out through the seal 22 for external electrical connection.

Preferably all of the terminal pads 32, 38 are located on one of the two substrates 20, 21. However, if desired, some of the terminal pads may be located on one and some on the other substrate, while still obtaining some of the advantages of the present invention as will be evident from the description herein.

To make the miniature image source 10, the substrates 20, 21 are prepared. The substrate 20, for example of glass, has the respective electrically conductive paths, backplane electrode, and terminal pads formed thereon. The active matrix substrate 21 has the active matrix formed in the semiconductor material 52 thereof with appropriate electrodes 33 exposed in the display area 27a. The respective conductive paths associated with the active matrix 34 are terminated at terminal pads 35 outside of the display area 27a. Both substrates 20, 21 are appropriately treated, as may be desired, to obtain the desired liquid crystal alignment characteristics, for example, for variable birefringence operation, twisted nematic, or other type of liquid crystal cell operation.

Solder balls 36a are placed on the terminal pads 35 generally as is shown in FIGS. 8 and 9. An exemplary solder material is 50% tin/50%indium solder, which has a melting point of 125° C. Other types of solder and/or other material, such as conductive polymer and/or conductive epoxy, may be used to provide electrical connections 36 between the terminal pads 35 on the substrate 21 and the electrically conductive members 37 on the substrate 20. Exemplary other material includes metal, conductive plastic, or conductive epoxy; and others may be used, too.

The miniature image source 10 is assembled by joining the two substrates 20, 21. The description of manufacturing and assembling the miniature image source presented herein are for convenience of description only and are not intended to be limiting of the invention.

Each external connection for the active matrix 34 is made to a terminal pad 35 on the substrate 21. A small solder ball 36a, which is shown unmelted in FIG. 9 and melted, cooled and resolidified as connection 36 in FIGS. 2, 4 and 8, is placed on top of each terminal pad 35. The solder ball 36a is intended to be melted and then cooled and resolidified to complete a secure electrical connection 36 between respective pairs of terminal pads 35 and traces 37.

On the surface of the transparent substrate 20 is a transparent electrically conductive thin film that in part forms the backplane electrode 30 and in part has been patterned into a series of conductive traces forming the electrically conductive paths 37 and terminal pads 38. One end of each such trace 37 is positioned such that when the substrates 20, 21 are joined, it will line up with a terminal pad 35 on the active matrix substrate. The other end of each of the traces 37 extends to the edge of the transparent substrate 20 and forms a terminal pad 38 for external electrical connection to the controller 14 or to some other device. The transparent substrate 20 is taller than the active matrix substrate 21 as is seen in a comparison of FIGS. 5 and 8, thereby to expose the terminal pads 32, 38 for making such external electrical connections.

The seal 22 is formed of an adhesive material which preferably does not affect in a negative way the conductive traces of the respective substrates 20, 21, the substrate material, or the liquid crystal material. The seal material is deposited on the transparent substrate 20 in the pattern of a frame which circumscribes the display area 27 and space 23. Alternatively, the seal 22 may be applied to the active matrix substrate 21 or to both substrates. The size and position of the frame are such that when the substrates are joined, the terminal pads 35 of the active matrix substrate 21 and the portions 37a of traces 37 of the substrate 20 fall within the frame, and the terminal pads 32, 38 are outside the frame. The seal material may have pliability, flexibility and/or fluidic characteristics so as to allow the traces 31, 37 to pass therethrough (or thereunder) while the seal provides effective sealing function relative to the substrate 20 and the traces 31, 37. These characteristics of the seal 22 also provide for effective sealing function relative to the active matrix substrate 21. The seal 22 may be a thermoplastic. It may be a thermoset material which upon heating forms a mechanical connection of and fluidic seal for the substrates 20, 21. The seal may be a material which provides adhesive and sealing functions at ambient or usual operating temperatures of the image source 10 and which melts at elevated temperatures above such ambient operating temperatures. The seal may be an otherwise curable or curing material that is able to provide the indicated functions; examples include epoxy, silicone materials, and/or other materials.

The temperature required to melt the adhesive material of which seal 22 is constituted preferably is slightly higher than the solder melding point. There are many appropriate adhesives available for this purpose. One example is sold under the name Ablestik 681-14 which cures at 150° C. The above-mentioned exemplary solder has a melting point of 125° C., which thus meets the indicated criteria.

The substrates are joined facing toward each other, as is illustrated in FIG. 2. The active matrix points of contact to the traces 37 on the transparent substrate 20. Connection of the external electronics to the miniature image source therefore can be made on the transparent substrate 20 to the part or terminal pads 32, 38 of the conductive traces 31, 37 that extend beyond the end or edge of the active matrix substrate 21 and are therefore exposed for such connections as is seen especially in FIGS. 2 and 4.

The fill hole 25 is left in the seal 22 frame. It is through this hole that the liquid crystal material 24 is injected into the space 23 of the image source 10. An end seal or plug 26 is applied to close off the fill hole 25 after the filling process has been completed. If the liquid crystal material 24 is NCAP, PDLC or a polymer gel, that material may be placed in the space 23 before the substrates are brought together.

The temperature of the miniature image source is elevated sufficiently to reflow or to melt the solder balls 36a to adhere to and electrically to connect the respective pairs of terminal pads 35, 37a, and to melt the adhesive material to make the seal 22. Upon subsequent cooling the solder connections 36 solidify to make physical and electrical connection of the terminal pads 35, 37a and the seal 22 solidifies to adhere the substrates 20, 21 in relatively fixed parallel relation while sealing the space 23.

The image source 10 having an active matrix substrate 21 has thousands of pixel elements, including electrodes and electronic components to form the same, particularly in combination with the backplane electrode 30. Although the image source 10 has thousands of pixel elements only a small number of external connections are required, as is known in the field of active matrix display technology. The miniature image source 10 is inherently rugged and compact. The process to fabricate the image source 10 utilizes conventional liquid crystal manufacturing techniques, which avoids the need to develop special techniques to manufacture the image source.

An advantage of the method of the invention and the miniature image source 10 of the invention is the ability to make the liquid crystal cell 10', for example, and the image source 10 using processing techniques and procedures typically used in making standard liquid crystal cells, such as those which use a pair of glass substrates, displays and the like while maintaining relatively high yield. There usually is no need to rub the semiconductor or active matrix substrate, which itself improves yield. Such standard processing and improved yield helps to reduce the cost of devices according to the invention and improves reliability of those devices and of systems using them.

In using the miniature image source 10, electrical signals provided by the controller 14 are provided to cause formation of one or more images. The images are created in response to incident light from the light source 12 directed to the image source 10, such incident light being, for example, elliptically, circularly, or plane polarized, and cooperative operation of the optics 13 with the light received from the image source. The images can be viewed directly or projected.

From the foregoing, it will be appreciated that the present invention provides a miniature image source capable of forming images for viewing or projection and a method for making the image source using conventional liquid crystal cell processing without the need for special processing otherwise required for active matrix substrate type liquid crystal cells.

It will be appreciated that the features of the miniature image source 10 of the present invention may be used in a head mounted display type of device. Also, features of the invention may also be employed in other types of display systems. One example is a display system that uses only a single display system of the type described herein. Such display system may be located in proximity to an eye for direct viewing. Such display system also may be used as part of a projection type display in which light from the display system is projected onto a surface where the image is formed for viewing. Various lenses and/other optical components may be used to direct from the display system light to create an appropriate image at a desired location.

The embodiments of the invention claimed are, as follows:

1. An optical display, comprising
   an active matrix-formed on a semiconductor substrate,
   a substantially transparent electrode pattern on a transparent substrate, said electrode pattern including portions for connection to an external device,
   mechanical and electrical connection attaching the semiconductor substrate to the transparent substrate through contacts from the active matrix to contacts on the transparent substrate for connection to an external device while providing a spacing between substrates to contain a material for producing an optical response according to applied electrical input, and
   a space between the substrates to contain said material.

2. The display of claim 1, wherein the surfaces of the substrates are preconditioned for proper alignment.

3. The display of claim 1, further comprising liquid crystal material substantially filling said space.

4. The display of claim 3, said liquid crystal material comprising operationally nematic liquid crystal material.

5. The display of claim 3, said liquid crystal material comprising smectic liquid crystal.

6. The display of claim 3, said liquid crystal material comprising NCAP or PDLC.

7. The display of claim 3, wherein the liquid crystal material in relative proximity to one substrate exhibits generally homeotropic alignment and the liquid crystal material in relative proximity to the other substrate exhibits generally homogeneous alignment.

8. The display of claim 1, said mechanical and electrical connection comprising respective connections of substantially all contacts of said active matrix to respective contacts on said optically transparent substrate for connection to an external device.

9. The display of claim 1, said active matrix or semiconductor substrate including means to reflect light toward said transparent substrate.

10. The display of claim 1, said connection comprising heat activated material.

11. The display of claim 10, said connection comprising solder.

12. The display of claim 10, comprising heat activated material for sealing said space.

13. The display of claim 1, wherein a surface of one of said substrates is relatively smooth and a surface of the other substrate is relatively rough compared to said relatively smooth surface.

14. The display of claim 1, further comprising polarizer means.

15. The display of claim 1, further comprising a source of light.

16. The display of claim 1, further comprising a seal sealing said space, a portion of said electrode pattern being within said space as contacts for connection with contacts of said active matrix and a portion of said electrode pattern being outside said space for connection to an external device.

17. The display of claim 1, said semiconductor substrate comprising a flip chip.

18. A method for making a display, comprising the steps of
   forming an active matrix on a semiconductor substrate,
   forming a substantially transparent electrode pattern on a transparent substrate including portions for connection to an external device,
   attaching the semiconductor substrate to the transparent substrate through contacts from the active matrix to contacts on the transparent substrate for connection to an external device to provide a spacing between substrates to contain a material for producing an optical response according to applied electrical input, and
   sealing a space between the substrates to contain said material.

19. The method of claim 18, further comprising the step of preconditioning surfaces of the substrates for proper alignment of said material in the space prior to sealing.

20. The method of claim 18, further comprising substantially filling said space with said material.

21. The method of claim 20, said material comprising operationally nematic liquid crystal material.

22. The method of claim 20, said material comprising smectic liquid crystal.

23. The method of claim 20, stud material comprising NCAP or PDLC.

24. The method of claim 18, said attaching comprising attaching substantially all contacts of said active matrix to respective contacts on said optically transparent substrate for connection to an external device.

25. The method of claim 18, said sealing comprising placing thermally activatable sealing material between said substrates and elevating the temperature of said sealing material to activate it.

26. The method of claim 18, said attaching comprising placing a thermally activatable electrical material between respective contacts and elevating the temperature of said electrical material to activate it, and said sealing comprising placing a heat activated seal material between the substrates, said seal material having an activation temperature larger than the activation temperature of said electrical material.

27. The method of claim 18, said attaching comprising placing a thermally activatable material between respective contacts and elevating the temperature of said material to activate it.

* * * * *